Sept. 16, 1952     H. C. SCHRECKENGOST     2,610,566
VENTILATING DEVICE FOR AUTOMOBILES Filed Aug. 25, 1948

INVENTOR
Harold C. Schreckengost
BY
Florian G. Miller
ATTORNEY

Patented Sept. 16, 1952

2,610,566

UNITED STATES PATENT OFFICE 2,610,566

VENTILATING DEVICE FOR AUTOMOBILES

Harold C. Schreckengost, Erie, Pa.

Application August 25, 1948, Serial No. 46,103

2 Claims. (Cl. 98—2)

This invention relates generally to ventilating devices for automobiles and more particularly to a detachable air deflector for attachment to the front window frame of an automobile to deflect air coming into the car.

In automobiles having rotatable ventilating windows disposed in the forward part of front side window frames, it has been found that the air passing into the automobile is in a substantially horizontal plane about the height of the faces of the persons seated in the car. Dust, dirt and the like now passes into the car and into the faces of the persons seated therein. This has been particularly bad when persons in the automobile are smoking, inasmuch as ashes are blown in the eyes of the driver, sometimes causing serious accidents. Air deflectors have been devised for attachment to the trailing edge of the rotatable ventilating windows and others have been devised for positioning on the outside of the front side windows but none of these devices has overcome the difficulty of the admission of air into the automobile in substantially a horizontal plane at the height of the persons seated in the automobile.

It is, accordingly, an object of my invention to provide a novel air deflecting device for attachment to the front vertical portion of the front side window frames of an automobile which overcomes the above and other defects in present ventilating devices and it is more particularly an object of my invention to provide an air deflector for deflecting air downwardly from the forward portion of the front window of an automobile which is simple in construction, economical in cost, economical in manufacture, easy to install, and efficient in operation.

Another object of my invention is to provide a one-piece stamped or molded air deflecting member which may be attached to the vertical front frame member of a front side window of an automobile between the groove therein and a flexible sealing member disposed in the groove without the utilization of any bolts, nuts, screws or any other fastening devices.

Another object of my invention is to provide an air deflector for positioning on the front inside edges of the front side windows of an automobile which is positioned in the side of the car adjacent the corner of the body of the car without decreasing the amount of visibility of the driver of the automobile.

Another object of my invention is to provide an air deflecting device adapted to be positioned on the vertical front side of the side window frames of an automobile wherein rotatable ventilating windows are assembled.

Other objects of my invention will become evident from the following description, taken in conjunction with the accompanying drawings, in which Fig. 1 is a perspective view of my novel air deflector assembled on the front side of a front side window frame of an automobile;

Figure 1:
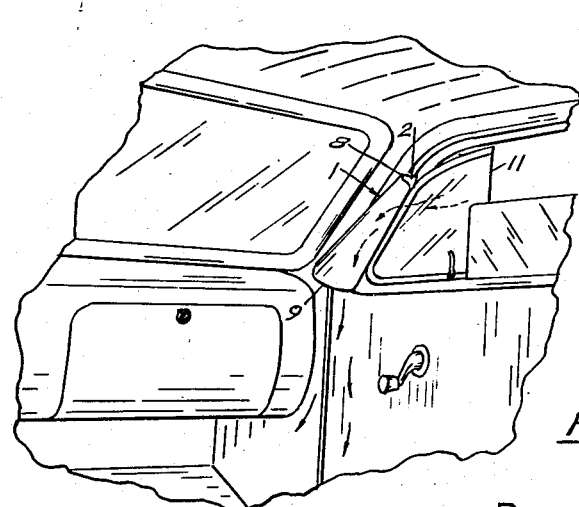
Figures 2, 3:
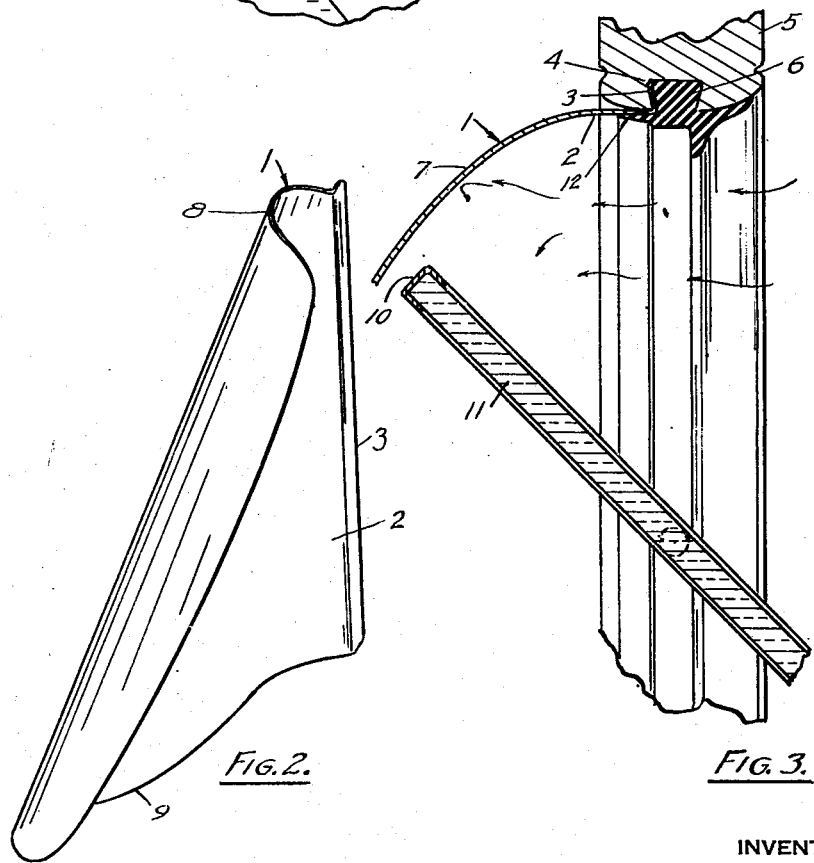
Fig. 2 is a perspective view of my novel air deflector.
Fig. 3 is a horizontal sectional view showing my novel air deflector secured in the peripheral groove of a front side window frame of an automobile by a rubber gasket therein.

Referring now to the drawings, Figs. 1 to 3 inclusive show a plate member 1 having a laterally extending flat portion 2 with a substantially straight flanged edge 3. The flanged edge 3 is adapted to be disposed adjacent the inner side of the peripheral groove 4 of a side window frame 5 of an automobile, a flexible sealing strip 6 of rubber or the like is disposed in the groove 4 securing the edge 3 in this position. The curved portion of the member 1 extending outwardly from the flat portion 2 is bent in substantially the shape of a segment of a cone with the radius of the curvature at the top 8 thereof being comparatively smaller than the radius of the curvature at the bottom 9 thereof, the radius increasing gradually from the top of the curved portion to the bottom of the curved portion as shown particularly in Fig. 2 The reference axis of the curved portion 7 of the member 1 is inclined with reference to the straight edge 3 in both a horizontal and a vertical plane. The radius of the curved portion 7 is such that the leading edge 10 of a rotatable ventilating window 11 will clear the curved portion 7 of my novel air deflector upon rotation thereof. I have found that by making my novel air deflector of a flexible metal such as aluminum that it is easily formed initially and it may be easily bent to form a contour in a substantially parallel relation to the leading edge 10 of the ventilating window 11 through its rotation.

My novel air deflector is made in both right and left hand types for disposal on both the right and left hand front side windows of an automobile. A right and a left hand deflector is provided as a pair for an automobile for attachment to the front side windows thereof. In attaching my novel air deflector to the front side of a front window frame of an automobile, it is merely necessary to pull back the edge 12 of the sealing strip 6 and enter the flanged edge 3 of the flat portion 2 into the groove 4 adjacent to the inner side thereof as shown in Fig. 3. It will be evident that the sealing strip 6 will hold the air deflector 1 firmly. Upon the opening of the ventilating window 11, the air admitted to the automobile will be deflected downwardly in the front portion of the car thereby ventilating the front portion of the car without having any of the air forced into the faces of the persons seated in the front seat of the car.

From the foregoing description, it will be seen that I have provided a comparatively cheap, economical one-piece air deflector which may be easily installed in any conventional automobile window to deflect the air coming into the front window of the car, away from the faces of the occupants when the rotatable window therein is opened.

Various changes may be made in the specific embodiment of my invention without departing from the spirit thereof or from the scope of the appended claims.

What I claim is:

1. A quickly attachable and detachable air deflector for ventilating an automobile for mounting in a conventional automobile window frame having a straight edged portion at the forward inner side of the vertical edge thereof and having a central peripheral groove with a sealing gasket therein comprising an arcuate shaped plate member having a substantially straight flanged edge for disposal on the straight edged portion of the inner side of the groove in said vertical edge in the front of said window secured by the gasket therein, said member being of less length than the height of said forward vertical edge of said window and the arcuate portion of said member being flared outwardly from the straight edged portion thereof, said arcuate portion increasing in radius from the top to the bottom thereof substantially defining a segment of a cone, said curved portion being bent on an axis defining an acute angle with the straight flanged end thereof and with said radius of said arcuate portion gradually increasing from top to bottom.

2. A quickly attachable and detachable air deflector as set forth in claim 1 wherein said deflector is bent on a substantially straight line defining an acute angle with respect to a first vertical plane parallel to said window and passing through said straight edged portion and also defining an acute angle with respect to a second vertical plane disposed at right angles to said first vertical plane.

HAROLD C. SCHRECKENGOST.

REFERENCES CITED

The following references are of record in the file of this patent:

UNITED STATES PATENTS

| Number | Name | Date |
|---|---|---|
| 791,488 | Nefflen | June 6, 1905 |
| 1,891,390 | Liebig | Dec. 20, 1932 |
| 1,967,504 | Gaughran, Jr. et al | July 24, 1934 |
| 1,998,126 | Fisher | Apr. 16, 1935 |
| 2,100,829 | Young | Nov. 30, 1937 |
| 2,147,855 | Normandin | Feb. 21, 1939 |
| 2,465,345 | Elsebusch | Mar. 29, 1949 |
| 2,468,439 | Gregorius | Apr. 26, 1949 |